United States Patent
Steinbiss

(10) Patent No.: US 7,962,337 B2
(45) Date of Patent: Jun. 14, 2011

(54) METHOD OF OPERATING A SPEECH RECOGNITION SYSTEM

(75) Inventor: Volker Steinbiss, Aachen (DE)

(73) Assignee: Nuance Communications, Inc., Burlington, MA (US)

( * ) Notice: Subject to any disclaimer, the term of this patent is extended or adjusted under 35 U.S.C. 154(b) by 906 days.

(21) Appl. No.: 10/498,959

(22) PCT Filed: Dec. 16, 2002

(86) PCT No.: PCT/IB02/05471
§ 371 (c)(1),
(2), (4) Date: Jun. 16, 2004

(87) PCT Pub. No.: WO03/054854
PCT Pub. Date: Jul. 3, 2003

(65) Prior Publication Data
US 2005/0096905 A1    May 5, 2005

(30) Foreign Application Priority Data
Dec. 21, 2001  (DE) .................................. 101 63 213

(51) Int. Cl.
*G10L 15/04* (2006.01)
(52) U.S. Cl. ..... 704/251; 704/246; 704/270; 704/270.1; 704/275

(58) Field of Classification Search ................... 704/246, 704/251, 270, 270.1, 275
See application file for complete search history.

(56) References Cited

U.S. PATENT DOCUMENTS

| 5,930,751 | A  | * | 7/1999 | Cohrs et al. ................... 704/231 |
| 6,415,258 | B1 | * | 7/2002 | Reynar et al. ................. 704/275 |
| 6,584,439 | B1 | * | 6/2003 | Geilhufe et al. .............. 704/270 |
| 2003/0009341 | A1 | * | 1/2003 | Cheng et al. ................. 704/275 |

FOREIGN PATENT DOCUMENTS
WO     WO 00/41065    *   7/2000
* cited by examiner

*Primary Examiner* — Leonard Saint Cyr
(74) *Attorney, Agent, or Firm* — Sunstein Kann Murphy & Timbers LLP

(57) ABSTRACT

In methods of operating a speech recognition system, a speech signal from a user is analyzed for recognizing speech information contained in the speech signal. When situated in an active receive mode, an acknowledgement of receive activity is produced in response to an inquiry about the receive activity from a user. In another embodiment, before speech data including at least a portion of the speech signal and/or at least a portion of the speech information are transmitted from an internal user-controlled area into an external area, the respective speech data are filtered and/or a message is sent to the user that a transmission of the speech data to the external area is imminent.

8 Claims, 1 Drawing Sheet

METHOD OF OPERATING A SPEECH RECOGNITION SYSTEM

Figure 1:
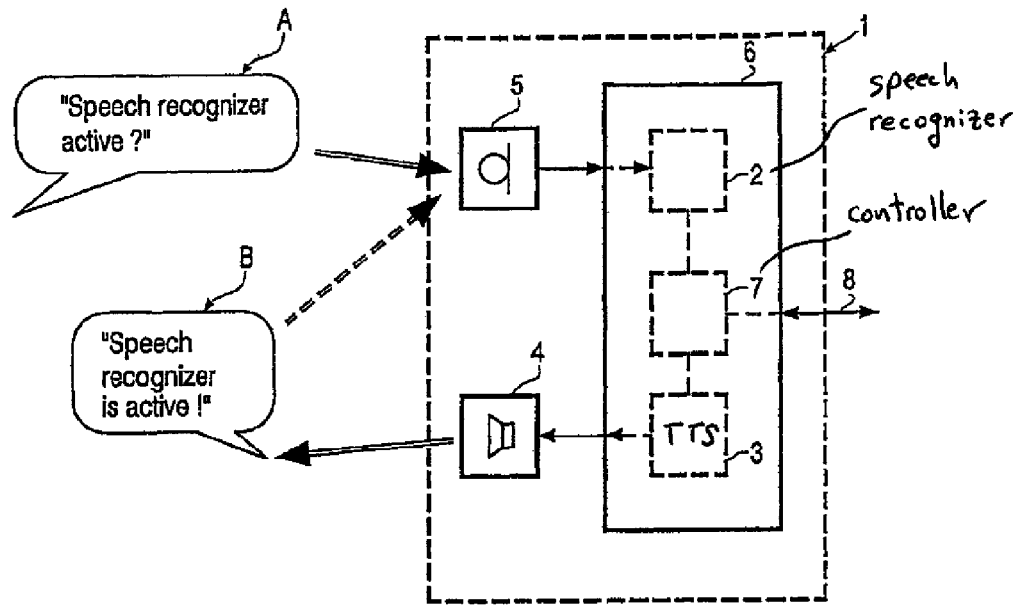

The invention relates to methods of operating a speech recognition system, in which methods a speech signal from a user is analyzed for recognizing speech information contained in the speech signal. In addition, the invention relates to associated speech recognition systems for implementing the methods.

As speech recognition systems show enhancing efficiency, they are more and more used in a large variety of fields of application. For example, already now there are dictation systems operating fairly satisfactorily in which a speech recognition system implemented on a PC captures the user's continuous speech, recognizes it and writes it in a text data file which can then be further processed by the user via a customary text processing program. Furthermore, there have been various technical devices for some time already which are controlled by speech recognition systems. These devices, however, have only a very limited context of command words which are necessary for controlling the device. Such speech controls have many advantages. A major advantage is that a speech control can be effected hands-free by the user and therefore is useful and particularly in such situations in which the user needs his hands for other purposes. It relates, for example, to the control of peripheral devices such as music systems, mobile radio sets or navigation systems in motor vehicles which are therefore ever more offered containing speech controls. Speech recognition systems or speech controls, respectively, are also extremely helpful for persons who have considerable movement impediments and therefore only have speech available as their only communication and control means. In addition, speech controls are also advantageous in general, because they form an interface between man and machine which interface is adapted to the natural main communication means of man, that is to say, speech. Other man-machine interfaces such as, for example a keyboard by which electric pulses are generated for the machine, on the other hand, are adapted to the machine. Since the speech signals go from the speaking person to the acoustic capturing device, for example, a microphone of the speech recognition device in a wireless manner, a speech control further advantageously simultaneously provides an at least short-range remote control of apparatus without the need for further circuitry for this purpose. For example, in apparatus such as televisions, video recorders or other entertainment electronics devices in which remote control is customary nowadays, separate remote controls can be omitted if speech controls are used.

It may be assumed that providing individual devices with isolated speech control systems which understand words, sentences or commands etc. for their field of application, is only a first stage with respect to the development of automatic speech recognition systems for general living conditions. As a result of the continuous fast moving technical development, a state, in which the electronic devices including possible security systems at least in certain areas in a—possibly wireless—network are mutually combined and can generally be controlled and monitored by speech, will probably be reached in some years' time already. The speech of the user is then recorded by one or more microphones and processed by a central computer unit in a way that the user can speak to the various devices or functional units in the network as he likes. The user then interacts with a whole set of functional units or with a switching center for these functional units, which understands the user's language and provides that the individual functional units or apparatus are controlled in accordance with the commands given. In the network systems the switching function or co-ordination of the apparatus can also be performed by a plurality of speech recognition systems which are mutually networked instead of being performed by a single switching center with one speech recognition system, so that they collaborate in suitable fashion. The whole complex control system with the speech recognition system or with various speech recognition systems respectively, as well as the respective connected apparatus or such functional units may be considered a kind of "environmental intelligence".

The whole control system may be located in isolated form in the rooms of the user, for example, in a living area or a certain office area. The system, however, may also be connected to external devices, for example, to the Internet or to an intranet. More particularly also certain parts of a speech recognition system, for example, a highly efficient speech recognition module may be installed in an external computer which is called as required via a data line, for example, via the Internet or the intranet. The speech signal is then sent to the external computer and, subsequently, the recognized speech information is sent back to the respective system on site. Such large-scale network systems are advantageous per se because, as a rule, an accordingly powerful computer is to be available for powerful speech recognition and an appropriate networking makes it possible that a plurality of speech recognition or speech control systems can share a common external computer, so that this computer is utilized better.

In addition to the afore-mentioned many advantages which such an "environment intelligence" has—be it in the form of separate apparatus with separate speech recognition systems or in the form of a complex control system—there is, however, on the other hand, the disadvantage that the respective system always "belongs" to the user to extract commands to the system from the user's conversations. The problem is then that the user cannot easily establish on the basis of a complex networking of the individual speech recognition systems and apparatus and as a result of the components of the systems usually installed in the most inconspicuous way for optical reasons, whether the speech recognition system—or in case of a plurality of speech recognition systems, which speech recognition system—is active, or to what extent the individual speech recognition systems are active, respectively.

The user all the more faces this problem when a speech recognition system is concerned that is connected to an external area or if the speech recognition system is located completely or partly in an external area which the user cannot fully control, and speech data of the user are switched from the "internal" user-controlled area, for example, the living room or an office of the user to an external area. Speech data are then understood to be either the captured speech signal itself in its original or changed form, as appropriate, or the speech information or parts thereof recognized from the speech signal. The speech information recognized from the speech signal may be not only words or word combinations, sentences or the like, but also information about the identity of the speaking person which identity information can be established based on the characteristic biometric information contained in the speech signal. Similarly, the speech information may also contain information about the person's current frame of mind which can be extracted from the speech signals from, for example, changes of voice, pitch, rapidity of speech etc.

Since it is not transparent to the user whether and in which form his utterances at a certain point of time are detected and analyzed or stored and/or listened to by a speech recognition system, situations may arise in which the user feels disturbed by the permanent listening of the speech recognition system or speech recognition systems, respectively. This certainly holds for situations in which the user wishes to hold a confidential conversation. This naturally particularly holds for a use of extremely powerful speech recognition systems which are not only capable of understanding certain command words or command word combinations but can capture, analyze and process the user's continuous speech. It is then highly unpleasant for the user not to know whether his speech is recorded even within the speech recognition system or is processed in another way as, for example, a query for certain keywords or certain sentences is made or even statistics are developed about negative remarks which are recorded under a certain theme. This is usually obviously not desired by the user.

Therefore, it is an object of the invention to provide respective methods or speech recognition systems in which the user can better control in how far utterances made by him are captured and processed by a speech recognition system.

This object is achieved, on the one hand, in that the speech recognition system, in so far as it is situated in an active receive mode emits to the user an acknowledgement of receive activity in response to a user's enquiry about receive activity in which the user queries whether the speech recognition system is situated in an active receive mode. The idea of active receive mode is used here for a state in which speech signals are captured and processed in some way by the system. A system is always in the active receive mode when the speech recognition system quasi "listens in". In addition, there may be, for example, an operating mode in which the system is "ready to receive". In such a mode the system is only active in the way that it only waits for a certain command such as, for example, "speech recognizer on", by which the speech recognition system can be switched on as required. So the user has the possibility of communicating with the speech recognition system by an arbitrary word, a sentence, a word combination or via another defined acoustic signal so that he hears from the speech recognition system itself whether it is listening. The user thus particularly before he makes confidential remarks always has the possibility of being informed about the activity of the speech recognition system or of a speech recognition system.

With respect to the transmission of speech data to an external, not user-controlled area, the object is achieved in that before speech data comprising at least a portion of the speech signal and/or at least a portion of speech information recognized from the speech signal are transmitted from an internal user-controlled area into the external area, they are filtered and/or a message is sent to the user. In this way the user keeps control of his speech data before they reach the external area or it is at least shown that such data are transmitted to an external area, so that he can withhold confidential utterances which he would not like to reach the external area.

To implement the first method, the speech recognition system needs to have a signaling device for sending an acknowledgement of receipt to the user to indicate to the user in some way the active receive mode. Furthermore, the speech recognition system is to be designed such that in the active receive mode the enquiry about active receive activity from the user can be recognized and, accordingly, the acknowledgement of receive activity is transmitted via the signaling device. The signaling device may be a speech output device of the speech recognition system, for example, a text-to-speech converter or an output with predefined, stored audio texts which are played back to the user. In this case the acknowledgement of receive activity takes place in the form of a respective speech signal to the user, for example, via a message "speech recognition system is active".

To implement the second method, the speech recognition system which comprises a component in the external area or is connected to the external area so that certain speech data are transmitted to the external area, is to have a suitable filter device which filters the speech data prior to their transmission to the external area. Alternatively, or additionally, it is to comprise a signaling device to signal to the user beforehand when such a transmission of speech data to the external area will take place. This signaling device may also be a speech output device by which the speech recognition system emits a respective speech signal to the user via the loudspeaker.

More particularly when a plurality of speech recognition systems could be active, it is appropriate when the acknowledgement of receive activity contains information from which the user learns which speech recognition system is concerned. In case of a plurality of network speech recognition systems the acknowledgement of receive activity is then sent also collectively for all the active speech recognition systems via a speech output device, for example, via a message called "speech recognition systems X, Y and Z are active".

To enhance the reliability of the method or of the speech recognition system, respectively, preferably the emission of the acknowledgement of receive activity is tested by the speech recognition system itself. In case of an erroneous, more particularly in case there is no acknowledgement of receive activity at all, the speech recognition system reacts in the manner defined above. Preferably the system deactivates itself. This measure avoids the user getting the idea that no speech recognition system is in the active receive mode because he does not receive any acknowledgement of receive activity in response to a query about receive activity—for example because the speech recognition system contains an error or as a result of an intentional manipulation of the signaling unit. In so far as the acknowledgement of receive activity is a speech signal, the check can be made relatively simply in that the speech recognition system detects the emission of its own speech signal with the means with which also the speech signals from the user are detected and in the subsequent recognition or processing respectively, recognizes the emission of its own speech signal as its own acknowledgement of receive activity.

The user preferably always has the possibility—when, for example, he wishes to give a confidential utterance which should not be captured by a speech recognition system—to deactivate an active speech recognition system by means of a spoken command and to reactivate it again as required. A method in which the user has the possibility of temporarily deactivating the system for a certain period of time is preferred. After the predefined time period has elapsed, the speech recognition system autonomously switches on again.

More particularly with such an automatically realized switch-over from a deactivated mode to an active receive mode it is advantageous for the speech recognition system to show the switch-on by itself. Such an activation message may be, for example, an optical or an acoustic message, for example, a speech signal again. An acoustic message is advantageous in so far as the user can record it irrespective of his position and the direction in which he is looking.

Additionally, it is possible for the speech recognition system also to show optically whether it is in the active receive mode. Such a permanent optical message is possible because it usually does not disturb the user. However, it has the drawback that it cannot be recognized well from any position of the user so that preferably an acoustic signaling should additionally follow to enhance the reliability in certain situations, that is, for example in response to said enquiry about receive activity or in case of an automatic switch-on.

When a plurality of speech recognition systems are used, the user should preferably have the opportunity to access a specific speech recognition system and to deactivate and activate it again. For example, it is certainly appropriate when the user does not deactivate rudimentary speech recognition systems located in the internal area which are only capable of recognizing certain command words for controlling certain devices, but all speech recognition systems which are capable of recognizing and processing continuous speech and/or via which the speech data could reach an external area.

The filtering of the speech data leaving the external area may be effected automatically. The key speech data mentioned there may be, for example, keywords, key sentences or whole sequences of key sentences. The speech data are compared with these key speech data during filtering and depending on the match with the key speech data there is then decided whether the speech data are transmitted or not to the external area. It is then possible to predefine both key speech data which can be transmitted without any problem, and key speech data which are certainly not to be transmitted.

Another embodiment includes a possibility of the user to manually filter the speech data himself. Such a manual selection after the system has shown that it will be a transmission of speech data, may naturally also be effected in addition to an automatic filtering. For example it is possible to store certain key speech data with which the outgoing speech data are compared and only when a comparison of the speech data provided for the transmission with the key speech data shows a match, will this be shown to the user and will there be a manual post-filtering or check by the user.

In a preferred embodiment the second method in which the speech data transmitted to an external area are filtered or the transmission is checked by the user is combined with the first method in which the user receives an acknowledgement of receive activity in response to an enquiry about receive activity. Such a combined speech recognition system, which comprises the two variants, offers the user the full control of the speech signals uttered by him i.e. the user has control of the fact that, depending on the degree of confidentiality of the utterances and, as required, with respect to the control possibilities in the area used by him, either to totally deactivate the speech recognition system or simply exactly control or prevent the transmission of his speech data to the external area.

Figure 2:
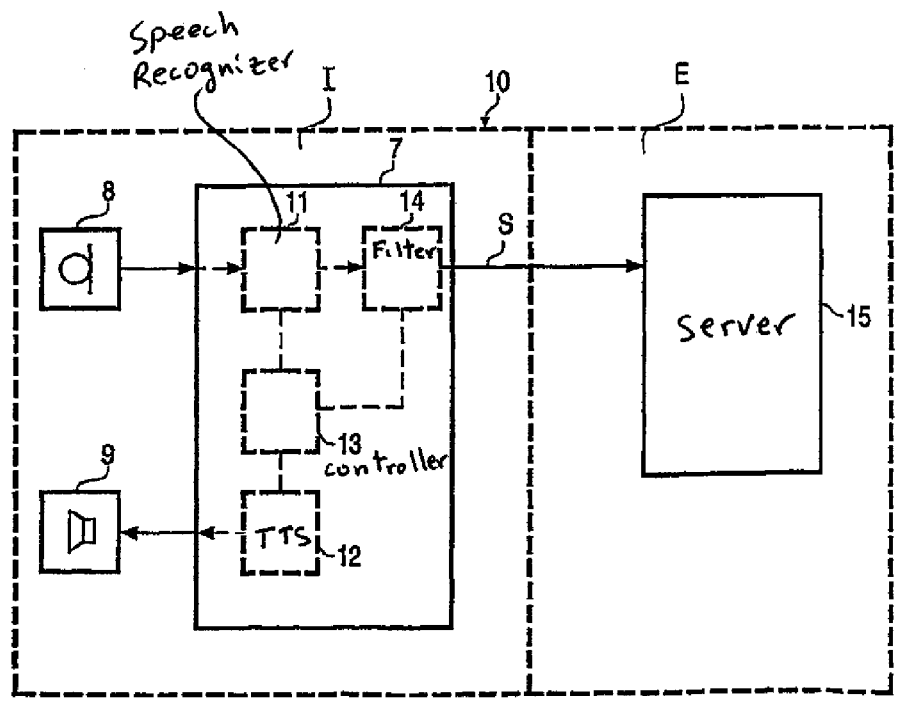

The invention will be further explained in the following with reference to the appended drawing Figures by means of examples of embodiment, in which:

FIG. 1 gives a diagrammatic representation of a speech recognition system when an acknowledgement of receive activity is issued, FIG. 2 gives a diagrammatic representation of a speech recognition system which has a component in an external area.

In the example of embodiment shown in FIG. 1 a relatively simple speech recognition system 1 is concerned which comprises a single system computer unit 6, for example, a PC, on which a speech recognition software module 2 is implemented. This speech recognition module 2 shown only as a block 2 obviously comprises not only the usual program portions with the speech recognition algorithms, but suitable libraries, rules of grammar etc. on the basis of which the recognition is performed. All necessary hardware components such as processor, memory location etc. are rendered available by the computer unit 6.

A microphone 5 is connected to the computer unit 6 to capture the speech signals. The speech signals recorded by the microphone 5 are analyzed in the computer unit 6 of the speech recognition module 2.

Furthermore, the computer unit 6 includes as a speech output device a text-to-speech converter (TTS converter) 3 by which the speech recognition system generates speech signals for communication with a user (not shown). Also this TTS converter 3 is a software module. The speech signals are output via a loudspeaker 4 connected to the computer unit 6.

The computer unit 6 further includes a control module 7 for driving a desired device or various devices in response to the recognized speech information and for driving the speech output unit 3. The control of further devices (not shown) is performed via the data link 8. Similarly, the control module 7 may also be instrumental in driving the speech recognition module 2 and/or the microphone 5 or microphone input respectively on the computer unit 6. The speech recognition system 1 may thus be activated or deactivated in this manner.

It is once more expressly stated that the speech recognition system 1 is only a very simple example and that the speech recognition system 1 may also be constructed in a more complex form. It may particularly comprise a plurality of different speech recognition modules which have, for example, different performance and/or are used for different applications. The speech recognition modules may then be used as required for controlling various apparatus or functional units while it is also possible for certain apparatus to have certain speech recognition modules fixedly assigned to them. The speech recognition system may also include other speech recognition devices of different type. Furthermore, the computer unit 6 may have a large variety of additional programs to react to speech commands from the user in a predefined manner, depending on the assignment, for example to control a certain connected device or system. The computer unit may also be a computer which is further used for other applications, for example, a PC of the user. The speech recognition system may also comprise an arbitrary number of networked computer units over which the various tasks or software modules, respectively, are distributed.

In order that the user can at any time check whether speech signals uttered by himself are captured by the speech recognition system 1 and processed, he has the possibility of making an enquiry about speech activity A to the speech recognition system 1. Typically would be here, for example, the enquiry A "speech recognizer active?". In so far as the speech recognition system is in the active receive mode, that is that it is in a mode in which speech signals of the user are captured and processed, the microphone 5 also automatically captures this enquiry about receive activity A and the speech recognition module 2 analyzes it. At that point the enquiry A "speech recognizer active?" is recognized as speech information from the speech signal. The recognized enquiry A is then processed, for example, by the control module 7. This control module 7 is programmed in such a way that in response to a recognized enquiry about speech activity A by means of the TTS converter 3 a respective acknowledgement of receive activity B is issued via the loudspeaker 4, for example, the sentence "speech recognizer is active".

As a result of a failure or a manipulation on the computer unit 6, the data lines or further devices of the system 1, respectively, for example as a result of an interruption of the line from the output of the TTS converter 3 to the loudspeaker 4, it may happen that no acknowledgement of speech activity B is issued to the user although the user has sent an enquiry about speech activity A to the speech recognition system 1 and the speech recognition system 1 is in the active receive mode. The user would then unjustifiably feel "safe". Therefore, the control module 7 is programmed such that a check is made whether the acknowledgement of speech activity B issued by the loudspeaker 4 is again captured by the microphone 5 of the speech recognition system 1 and recognized by its own speech recognition module 2. In so far as the speech recognition system not again records via its own input channel the acknowledgement of speech activity B within a given time period after this acknowledgement of speech activity B has been issued, the control module 7 will deactivate the speech recognition module 2 at least in so far as the speech recognition system 1 is still in a position to react to a certain command such as "speech recognition system on".

In a more complex speech recognition system which comprises a plurality of speech recognition modules for various apparatus, which apparatus may be activated and deactivated separately within the speech recognition system, it is highly suitable that it is also made known with the acknowledgement of speech activity in how far the speech recognition system 1 is active, for example, by issuing "speech recognition for TV and for video recorder are switched on".

Similarly, for a parallel use of various speech recognition systems 1 it is suitable for the acknowledgement of speech activity B to contain information about which speech recognition system answers, for example, via a message "speech recognition system for kitchen area is active". Conversely, the enquiry about speech activity A may not only be directed to certain systems but, globally, to all speech recognition systems in that the user, for example, makes a special enquiry about activity such as "speech recognition system for Internet and telecommunication active?" or a general enquiry about activity such as "any speech recognizer active?". This is especially suitable if, for example, only certain systems have a link to an external area and/or are in a position to understand continuous speech, whereas other speech recognition systems understand only a limited number of command words.

In case of a deactivation, the respective speech command may also be given globally to a plurality of speech recognition systems. For example, a command "all speech recognizers down for five minutes" can be received and processed by all the speech systems which are in the active receive mode at this point of time. The command may, however, also be given to individual speech recognition systems or individual speech recognition modules in a speech recognition system, which are specifically mentioned by the user.

FIG. 2 shows a simple example for a speech recognition system 10 which has a similar structure to the speech recognition system 1 shown in FIG. 1. This speech recognition system 10 also includes a computer unit 7 with a speech recognition module 11, a TTS converter 12 and a control module 13. Similarly, a microphone 8 for capturing speech signals from the user and the loudspeaker 9 for issuing speech signals from the TTS converter 12 are connected to the computer unit 7. This computer unit 7 in the speech recognition system 10 is situated in an internal area I which can be very well controlled by the user; for example this is a PC in the user's office.

A further component of the system 10 is located, on the other hand, on a central server 15 in an external area E, for example, on a server 15 of an intranet of a company. In case of certain actions speech data S, i.e. the user's speech signals recorded by the microphone 8 or speech information recognized from the speech signals by means of the speech recognition device 11, is transmitted to the external server 15 and thus to the intranet via the link from the computer unit 7 of the speech recognition system 10 to the external server 15. The user himself then usually has no control of what happens with these speech data and in what form these speech data are used, stored and processed in addition to their own application. Therefore, the speech recognition system 10 according to the invention offers the user the possibility of checking the transmission of these speech data S to the external area E.

In the example of embodiment actually shown it is speech information already recognized by the speech recognition module 11 that is transmitted to the server 15 to surf on said intranet, for example, via the computer unit 7. This means that in this case not the speech signal of the user himself but the speech information recognized from the speech signal is transmitted to the server 15.

To avoid speech data S being transmitted to the external area E in a way undetected by the user, the outgoing speech data S are filtered in a filter 14 which is located in the computer unit 7 located in the internal area I. The filter 14 is here also a software module with an associated memory area in which keywords or word combinations are stored which can be freely selected by the user. They are then, for example, keywords or word combinations from which the user desires that he first gets a warning when certain speech data S contain these keywords or keyword combinations when they are to be transmitted to the external area E. Therefore, all outgoing speech data S are first compared with the keywords or keyword combinations respectively. In so far as speech data S contain these keywords or keyword combinations, the control module 13 causes the TTS converter 12 to issue a warning to the user through the loudspeaker 9.

This warning contains, for example, a reproduction of the speech data S which are on the point of being output. The user is then requested to give an acknowledgement for the transmission i.e. the speech recognition system 10 once more asks the user whether it is allowed to transmit the certain speech data S to the external area E.

The invention guarantees that persons who utilize speech recognition technologies in their daily lives may rest assured that these techniques are not misused for intrusion of privacy. The methods and speech recognition systems proposed consequently ensure that the ergonomic advantages of an "environment intelligence" understanding speech cannot be extended to a control system controlling the user. The user may thus use the advantages of the speech recognition systems and yet keep full control of the speech recognition systems, particularly by the knowledge of which speech recognition systems are active and in how far data leave a certain field of privacy.

The invention claimed is:

1. A method of operating a speech recognition system comprising the act of:
   analyzing, by a processor, a speech signal from a user for recognizing speech information contained in the speech signal;
   emitting an acknowledgment of a receive activity to the user in response to an inquiry from the user as to whether the speech recognition system is in an active receive mode where speech signals are captured and processed;
   wherein the acknowledgment of the receive activity comprises a speech output from a speech output device;
   wherein the speech output comprises issuing a specific message acknowledging that the speech recognizer is active;
   controlling output of the acknowledgment of the receive activity and, in case of an erroneous output of the acknowledgment of the receive activity, the speech recognition system deactivates itself.

2. The method as claimed in claim 1, wherein the acknowledgement of the receive activity comprises information for identification of a specific one or more speech recognition systems out of a plurality of speech recognition systems which is in the active receive mode.

3. The method as claimed in claim 1, further comprising the act of recognizing output of the acknowledgement of the receive activity by acoustically detecting output of the acknowledgement as a speech signal from the speech output device.

4. The method as claimed in claim 1, further comprising the act of temporarily deactivating the speech recognition system by a deactivation command from the user, the deactivation command containing a time parameter which predefines for how long the speech recognition system is deactivated.

5. The method as claimed in claim 1, further comprising the act of showing by the speech recognition system when it is switched over to an active receive mode.

6. A speech recognition system comprising:
  means for capturing a speech signal from a user;
  means for analyzing the speech signal for recognizing speech information contained in the speech signal;
  a signaling device for sending an acknowledgment of receive activity to the user to indicate that the speech recognition system is in an active receive mode in which speech signals are captured and processed;
  wherein the speech recognition system is arranged so that, while being in the active receive mode, the speech recognition system recognizes an inquiry about receive activity from a user by which the user queries whether the speech recognition system is in the active receive mode, and subsequently sends the acknowledgment of the activity;
  wherein the acknowledgment of the receive activity comprises a speech output from a speech output device;
  wherein the speech output comprises issuing a specific message acknowledging that the speech recognizer is active;
  means for controlling output of the acknowledgment of the receive activity and, in case of an erroneous output of the acknowledgment of the receive activity, the speech recognition system deactivates itself.

7. A non-transitory computer readable medium embodying a computer program, the computer program when executed by a processor is configured to operate a speech recognition system including performing the act of:
  analyzing a speech signal from a user for recognizing speech information contained in the speech signal;
  emitting an acknowledgment of a receive activity to the user in response to the user in response to an inquiry from the user as to whether the speech recognition system is in active receive mode where speech signals are captured and processed;
  wherein the acknowledgment of the receive activity comprises a speech output from a speech output device;
  wherein the speech output comprises issuing a specific message acknowledging that the speech recognizer is active;
  controlling output of the acknowledgment of the receive activity and, in case of an erroneous output of the acknowledgment of the receive activity, the speech recognition system deactivates itself.

8. A speech recognition system comprising:
  a processor;
  a speech recognizing module configured to recognize an inquiry from a user asking whether the speech recognition system is active;
  an output device configured to provide a response to the user responsive to the inquiry;
  a controller configured to deactivate the speech recognition system if the response is not provided;
  wherein the response of the receive activity comprises a speech output from the output device;
  wherein the speech output comprises issuing a specific message acknowledging that the speech recognizer is active;
  wherein the speech recognition system deactivates itself, in case of an erroneous output of the response of the receive activity.

* * * * *